(12) United States Patent
Albert et al.

(10) Patent No.: US 8,102,303 B2
(45) Date of Patent: Jan. 24, 2012

(54) METHOD FOR DISTANCE MEASUREMENT AND DATA TRANSMISSION IN A CONTINUOUS WAVE RADAR SYSTEM

(75) Inventors: Olaf Albert, Vienna (AT); Janos Gila, Mödling (AT); Reinhard Hladik, Vienna (AT); Martin Schiefer, St. Pölten (AT); Manfred Spandl, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 12/482,667

(22) Filed: Jun. 11, 2009

(65) Prior Publication Data

US 2009/0309780 A1 Dec. 17, 2009

(30) Foreign Application Priority Data

Jun. 13, 2008 (EP) .................................... 08010824

(51) Int. Cl.
*G01S 13/74* (2006.01)
(52) U.S. Cl. ........................................... 342/42; 342/30
(58) Field of Classification Search ........... 342/147–158
See application file for complete search history.

(56) References Cited

U.S. PATENT DOCUMENTS

| | | | | |
|---|---|---|---|---|
| 2,903,691 | A * | 9/1959 | Rossi et al. ..................... 342/95 |
| 5,153,836 | A * | 10/1992 | Fraughton et al. ............ 701/301 |
| 5,712,639 | A | 1/1998 | Hethuin |
| 5,796,362 | A | 8/1998 | Ayasli et al. |
| 6,570,913 | B1 * | 5/2003 | Chen .............................. 375/223 |
| 6,868,073 | B1 | 3/2005 | Carrender |
| 7,479,884 | B1 * | 1/2009 | Fullerton .................... 340/572.7 |
| 2003/0034887 | A1 | 2/2003 | Crabtree et al. |
| 2005/0170797 | A1 * | 8/2005 | Seisenberger et al. ........ 455/141 |
| 2005/0206555 | A1 * | 9/2005 | Bridgelall et al. ............ 342/127 |
| 2007/0268112 | A1 * | 11/2007 | Watanabe .................... 340/10.1 |

FOREIGN PATENT DOCUMENTS

| | | |
|---|---|---|
| EP | 1 760 626 A2 | 3/2007 |
| EP | 1 903 412 A1 | 3/2008 |
| WO | WO 2005045455 A2 * | 5/2005 |
| WO | WO 2007060494 A1 * | 5/2007 |

OTHER PUBLICATIONS

Konno K et al: "60 GHz Millimeter-Wave Dual Mode Radar for IVHS" Topical Symposium on Millimeter Waves, 1997, Kanagawa, Japan, Jul. 7-8, 1997, New York, NY, USA, IEEE, US, Jul. 7, 1997, pp. 159-161, XP010289054, ISBN: 978-0-7803-3887-6.

* cited by examiner

*Primary Examiner* — Timothy A Brainard

(57) ABSTRACT

A method for distance measurement and data transmission in a continuous wave radar system is described. A continuous wave radar system has a transmit and receive module and at least one transponder device, a mobile control and monitoring device and an HMI system. Transponder devices are searched for with the aid of an unmodulated continuous wave signal as an interrogation signal, such that the transponder device can send a radio response signal to the transmit and receive module in response to the interrogation signal, as a result of which a data transmission takes place from the transponder device to the transmit and receive module. Upon completion of the data transmission a frequency-modulated continuous wave signal is generated in order to measure, on the basis thereof, a distance between the transponder device and the transmit and receive module.

18 Claims, 3 Drawing Sheets

METHOD FOR DISTANCE MEASUREMENT AND DATA TRANSMISSION IN A CONTINUOUS WAVE RADAR SYSTEM

CROSS REFERENCE TO RELATED APPLICATIONS

This application claims priority of European Patent Application No. 08010824.4 EP filed Jun. 13, 2008, which is incorporated by reference herein in its entirety.

FIELD OF INVENTION

The present invention relates to a method for distance measurement and data transmission in a continuous wave radar system. The present invention further relates to a continuous wave radar system having a transmit and receive module and at least one transponder device, a mobile control and monitoring device, and an HMI system.

BACKGROUND OF INVENTION

Radar systems are suited to contactless localization and distance determination of objects. Among a multiplicity of different radar systems, e.g. a frequency-modulated continuous wave radar system, also referred to in abbreviated form as FMCW radar, permits reliable distance determination between objects which are also e.g. spaced only a short distance apart from one another. Continuous wave (CW) radar radiation is typically used in such applications, rather than pulsed radar.

In frequency-modulated continuous wave radar systems, the frequency of the transmitted radar signals is subject to a periodic modulation, whereby transmitted radar signals that are reflected by an object exhibit, upon reentering the radar system, a shift in frequency compared to the transmitted radar signals, said frequency shift corresponding to a transit time difference. Said transit time difference represents twice the distance between the transmit and receive module and the reflecting object.

In order to localize or determine the distance of the reflecting object, received radar signals are typically subjected to spectral analysis in the receive module. For example, individual peaks in the power spectrum of the frequency shift shed direct light on the distance between the transmit and receive module and the reflecting object. Thus, for example, large frequency shifts correspond to large differences in transit time of the radar signals and consequently to great distances, whereas small frequency shifts correspond to small transit time differences and consequently to short distances.

The use of a radar system for determining the distance to a specific object is sometimes problematic, since multifarious external factors can have a substantial adverse effect on or interfere with the reception of reflected radar signals. Particularly in the presence of reflecting metal surfaces or bodies which absorb radar beams it is only possible to a limited degree to assign a received radar signal to a specific reflecting object. This problem can be at least mitigated by use of a transponder or a transponder device.

A transponder device is typically able to send a modulated radio response signal in response to an interrogation signal. If the receiver of the radar system is tuned to the modulation of the radio response signal, the radio response signals sent by a transponder device can be clearly separated from background and other interference signals with the aid of suitable filter methods and evaluated in order to determine the distance. Transponders can be embodied as passive or as active, i.e. power-amplifying, transponders.

The radio response signals modulated by a transponder device enable the distance between the transponder device and the receive module of the radar system to be determined. The use of a single transponder appears disadvantageous in particular in view of constantly changing ambient conditions. If, for example, the transponder and the receive module of the radar system are moving or absorbing or shadowing bodies are temporarily situated between the transponder and the receive module, this causes massive disruption to the reception of radio response signals as well as to the sending of interrogation signals to the transponder, with the result that determining a distance is no longer possible under certain conditions.

In order to localize or, as the case may be, determine the distance to a large, spatially extended object such as e.g. a machine, it is therefore beneficial to arrange a plurality of transponders around the machine so as to ensure an exchange of radio signals between the transmit and receive module and at least one transponder will be possible at any time.

Known from the prior art is a continuous wave radar system that has a spatially distributed arrangement of different transponders and can assign a radio response signal explicitly to one of the transponders. The radio response signal is subjected to a first modulation in the transponder so that the receive module can perform a distance determination between the transmit and receive module and the transponder. Furthermore, the radio response signal is subjected to a second modulation in the transponder in order to perform a data transmission between the at least one transponder and the transmit and receive module. In this way, for example, a transponder ID can be transmitted in order to identify the corresponding transponder with certainty.

In this case an interrogation signal which is transmitted by the transmit and receive module and in response to which the transponder sends the radio response signal, is a frequency-modulated continuous wave signal (FMCW signal). In other words the FMCW signal is used both for a data transmission and for measuring a distance. The interrogation signal is typically transmitted continuously in order to search for transponders, i.e. even when no transponders are present for communicating with the transmit and receive module. Since, however, the frequency of an FMCW signal is subject to a periodic modulation, it is very probable that adjacent transmit and receive modules which continuously transmit an FMCW signal will mutually affect one another, with the result that no reliable distance measurement can be performed. Furthermore, a transmit and receive module which constantly transmits an FMCW signal can interfere with other systems operating in the same frequency range, for example a WLAN system. Of course, these problems also occur when the FMCW signal is transmitted only temporarily. Moreover, an FMCW signal can also interfere with a data transmission in a continuous wave radar system from a transponder to a transmit and receive module, since the interrogation signal is typically very much stronger than the radio response signal.

A communication system which can be operated in two different modes is described in KONNO K ET AL: "60 GHz Millimeter-Wave Dual Mode Radar for IVHS" Topical Symposium On Millimeter Waves, 1997, Kanagawa, Japan, 7-8 Jul. 1997, pages 159-161, ISBN: 978-0-7803-3887-6. A base station transmits an unmodulated continuous wave signal in a first mode and a frequency-modulated continuous wave signal in a second mode, a mode selection signal of the base station determining the operating mode.

U.S. Pat. No. 6,868,073 B1 describes a distance measurement between two transponders. A first transponder sends an unmodulated signal to a second transponder in order to determine its identity. The second transponder sends its identity by means of a response signal to the first transponder, which checks the validity of the identity. If the validity is confirmed, the first transponder sends an acknowledgement to the second transponder, which after receiving said acknowledgement switches into a distance determination mode.

EP 1 903 412 A1 describes a method for enabling the operation of automation components of a technical system by means of a mobile control and monitoring device. The control and monitoring device receives a first identifier of a first transponder device. The control and monitoring device then sends a frequency-modulated carrier signal which is reflected by the first transponder device, thereby enabling the control and monitoring device to determine the distance to the transponder device.

SUMMARY OF INVENTION

An object of the invention is to develop a continuous wave radar system in such a way that a distance measurement between a transponder device and a transmit and receive module as well as a data transmission from the transponder device to the transmit and receive module can be reliably performed, in particular without affecting other systems.

The object is achieved by means of the features of the independent claims. Further advantageous embodiments of the invention are set forth in the dependent claims.

A first aspect of the present invention relates to a method for measuring distance and transmitting data in a continuous wave radar system in which a transmit and receive module and at least one transponder device are disposed. The transmit and receive module generates an unmodulated continuous wave signal with a predetermined frequency as an interrogation signal with the aid of which a search is conducted for a transponder device. A frequency-modulated continuous wave signal is generated only if the transmit and receive module receives from a transponder device a radio response signal which is generated in response to the interrogation signal. With the aid of said frequency-modulated continuous wave signal a distance is measured between the transmit and receive module and the transponder device which sends the frequency response signal to the transmit and receive module.

According to the invention, therefore, searches for transponder devices are conducted with the aid of an unmodulated continuous wave signal (CW signal) which has a predetermined frequency. This means that the frequency of the unmodulated continuous wave signal can be selected such that it lies in a frequency range which is not used by any other system. In this way interferences that disrupt other systems can be avoided. Furthermore, the frequency-modulated continuous wave signal (FMCW signal) is used exclusively for a distance measurement between the transmit and receive module and the at least one transponder device, which distance measurement is performed, for example, by means of a spectral analysis and the determination of a frequency shift of the radio response signal in relation to the transmitted FMCW signal. By this means it is possible for the FMCW signal to be transmitted for a very short time only, for 10 milliseconds per second, for example. Consequently there is only a very slight probability of mutual interferences occurring between said systems, as a result of which the coexistence of different transmit and receive modules and other systems, such as e.g. a WLAN system, is substantially improved.

In one embodiment of the present invention, the transmit and receive module includes a complex (complex-value) receiver which performs a decoding of the data transmitted by means of the radio response signal and a distance measurement based on the received radio response signal. For that purpose the complex receiver includes corresponding evaluation means for analyzing the complex radio response signal which are well-known in the prior art.

In an alternative, particular preferred embodiment of the present invention, the phase of the radiated unmodulated continuous wave signal is shifted with respect to the receiving local oscillator at a predetermined frequency preferably by $+/-90°$. The modulation shape is a rectangle, for example, with the modulation frequency amounting, for example, to approx. 8 kHz. This additional modulation component can be suppressed in the baseband in order thereby to capture the data transmitted by a transponder device in the transmit and receive module. Although the conversion of the phase of the unmodulated continuous wave signal by means of the auxiliary modulation of approx. 8 kHz leads to a deterioration in a signal-to-noise ratio (SNR) by 3 dB by comparison with a complex receiver, the radio response signal (backscatter signal) of the transponder device can be demodulated by means of a real receiver, as will be described in further detail below. Compared to conventional real systems which decode the radio response signal exclusively using a broadband FMCW signal, no additional loss results in the system according to the invention.

The phase shift can be implemented either in the transmit and receive module or in the transponder device.

In a further embodiment of the present invention, the predetermined frequency of the unmodulated continuous wave signal is subjected to frequency shift keying during the search for a transponder device. Said frequency shift keying takes place in the transmit and receive module. For example, the predetermined frequency is keyed within the ISM band between 2.400 GHz and 2.483 GHz at a frequency of, for example, approx. 4 kHz. This combats possible fading. An advantage of using the ISM band for the unmodulated continuous wave signal is that it is license-free and devices which use this band can be approved practically worldwide without a country-specific setting.

However, both the phase shift and the frequency shift keying generate parasitic modulations which have to be suppressed in the transmit and receive module. Said suppression can be accomplished, for example, with the aid of suitable filters, though the latter must allow through the data received from the transponder device. Furthermore, during the filter implementation attention must be paid to the group delay in order to avoid inter-symbol interference (ISI). Examples of filters which are suitable for suppressing the parasitic modulations are, for example, a boxcar filter, a CIC filter or an IIR filter. If the optional frequency shift keying of the frequency of the unmodulated continuous wave signal is implemented in the transmit and receive module, then out of the cited filters the boxcar filter is preferred, since it can very effectively suppress the phase modulation and the frequency shift keying because of its pole positions. If only the phase shift is implemented, either in the transmit and receive module or in the transponder device, then according to current knowledge the CIC filter provides a better suppression of the parasitic modulation than the IIR filter. In this case each of the filters cited by way of example possesses the property that the data received from the transponder device in the transmit and receive module can be demodulated without problems.

In a further preferred embodiment of the invention, the transmit and receive module includes a mixer for generating a real signal from a received radio response signal. In addition, the transmit and receive module preferably includes an evaluation unit for distance measurement and a demodulation unit for decoding the data transmitted by means of the radio response signal, the distance measurement and the decoding being based on the real signal. Particularly preferably, the complete signal evaluation of received radio response signals is performed on the basis of real signals so that evaluation means for analyzing complex signals can be dispensed with. In particular this enables the transmit and receive module to be implemented in a space-saving and cost-effective manner.

The mixer is embodied for mixing the received radio response signal with the transmit signal. The spectrum of a real useful signal obtained from said mixing can then be used by the evaluation unit for distance determination using an FMCW signal and for data decoding using a CW signal.

Implementing real radar signal evaluation permits a substantial reduction in component size and component costs compared to a complex evaluation, which requires an I/Q demodulation of the received radar signal. By using a real receiver and a real evaluation unit it is therefore possible to adhere to a necessary component size limitation, for example for a mobile control and monitoring device which includes the above transmit and receive module of a continuous wave radar system in which a search for transponder devices and a subsequent data transmission from a found transponder device to the transmit and receive module are performed with the aid of an unmodulated continuous wave signal. Furthermore, the real implementation of the receiving means and evaluation means permits a cost saving.

In yet a further embodiment of the present invention, a predetermined frequency range, for example the ISM band between 2.400 GHz and 2.483 GHz, is sampled before the unmodulated continuous wave signal is generated as an interrogation signal. By this means it can be ensured that a free frequency in the sampled frequency range, that is to say a frequency which is not reserved, is chosen for the frequency of the unmodulated continuous wave signal. In other words, spectrum monitoring is performed before the unmodulated continuous wave signal is generated at a predetermined frequency. This is because in the ISM band in particular there are a multiplicity of devices in operation, for example WLAN devices, which means that without a prior sampling there exists the risk that an already reserved frequency will be selected for the unmodulated continuous wave signal. In this way a probability that the transmit and receive module will interfere with other devices or, as the case may be, will be subject to interference by other devices, can be significantly reduced.

In yet a further embodiment of the present invention, the transmit and receive module is configured in order to generate the unmodulated continuous wave signal again for a predetermined time following completion of data decoding and/or distance measurement. In other words, as soon as the data decoding by means of the CW signal and/or the distance measurement by means of the FMCW signal has been completed, after 10 milliseconds for example, the FMCW signal is switched off and a CW signal generated once again. This step can be conditional on, for example, the characteristics of the transmit and receive module. However, said CW signal is also switched off after a predetermined time in order to avoid an unnecessary transmission of the CW signal. Coexistence is improved still further as a result.

A further aspect of the present invention relates to a mobile control and monitoring device for the automation components of a technical system which includes an above-described transmit and receive module. In order to avoid the automation system being controlled by the mobile control and monitoring device from an impermissible distance it is advantageous to localize the control and monitoring device and, depending on its position, enable or deactivate safety-relevant control operations of the technical system. Toward that end, the distance measurement is performed in order to be able to detect whether the mobile control and monitoring device is located within an active operating range.

Yet another aspect of the present invention relates to an HMI (Human Machine Interface) system, comprising at least one mobile control and monitoring device of the aforesaid kind. The term HMI device is a generic term and comprises all components belonging to this group of devices. "Operator panels", also referred to as "OPs" for short, shall be cited as an example. These can be implemented as stationary or mobile. In a networked automation environment, HMI devices serve as tools for operating personnel, enabling process data of the technical system that is to be controlled to be displayed or monitored. This function is referred to as "Supervisor Control and Data Acquisition" (SCADA). For this purpose the HMI device is generally specially constructed in terms of its hardware configuration, i.e. it possesses e.g. a touchscreen and is specially shielded against environmental influences. Special software is also executed therein. Said software provides functions by means of which the comfort, quality and safety of a control operation by an operator can be improved. Thus, HMI devices can be used e.g. to visualize, maintain, configure and generate interactive process maps of the technical system that is to be controlled. On the one hand this allows a selective display of responses of the technical system, mostly in the form of measured values and messages. On the other hand it is made possible to transfer the technical system into desired states by targeted specification of operator control actions and data inputs.

BRIEF DESCRIPTION OF THE DRAWINGS

Preferred exemplary embodiments of the invention are explained in more detail below with reference to the drawings, in which.

DETAILED DESCRIPTION OF INVENTION

Figure 1:
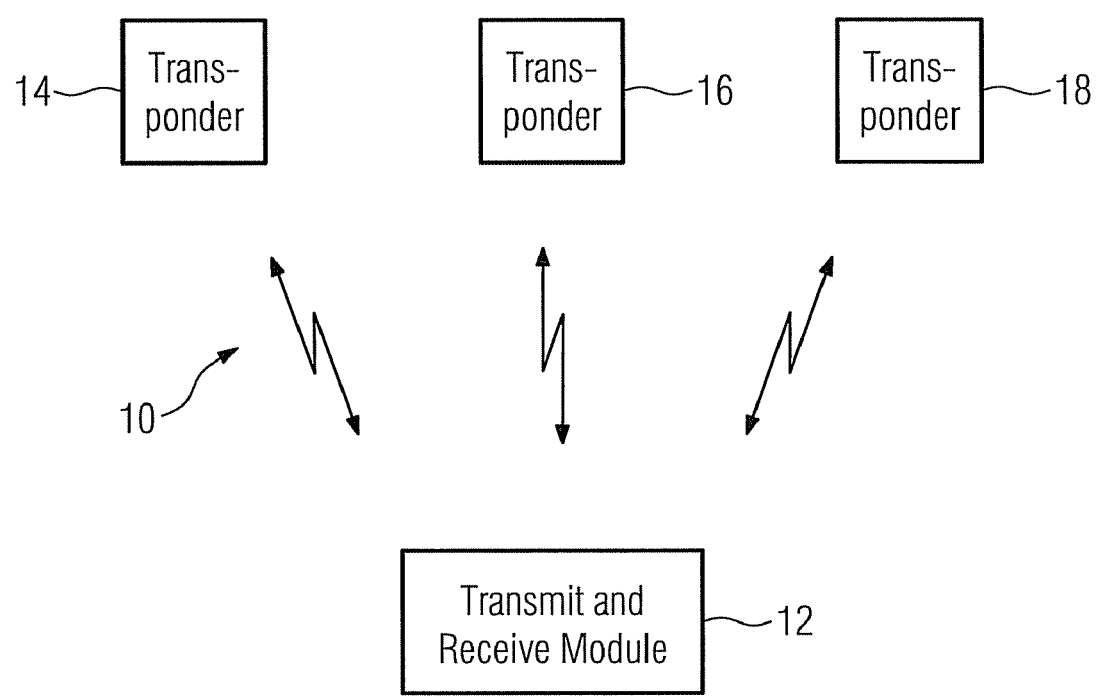
FIG. 1 shows a block diagram of a continuous wave radar system.

FIG. 1 shows a schematic block diagram of an exemplary embodiment of a continuous wave radar system 10 which has three transponders 14, 16, 18 and a transmit and receive module 12. The transmit and receive module 12 is configured to transmit interrogation signals which are received by the transponders 14, 16, 18, modulated, amplified if necessary, and sent back again as radio response signals. The carrier frequency of the interrogation signal or, as the case may be, of the radio response signals remains unchanged in this case (referred to as back-scattering) and typically lies in the GHz range, e.g. in the ISM band between 2.400 GHZ and 2.483 GHz.

The interrogation signal is an unmodulated continuous wave signal (CW signal). However, the transmit and receive module 12 transmits a frequency-modulated continuous wave signal (FMCW signal) instead of the unmodulated continuous wave signal as soon as a transponder has sent a radio response signal in response to the interrogation signal. A measurement of the distance between the transponder and the transmit and receive module 12 is then performed with the aid of the frequency-modulated signal. In other words, a data or information transmission from the transponder to the transmit and receive module and a measurement of the distance between these are performed sequentially, the FMCW signal being used exclusively for the distance measurement.

In order to enable better discrimination between radio response signals and signals which are reflected by other arbitrary objects, the radio response signals transmitted by the transponders 14, 16, 18 are subjected to a first modulation at a subcarrier frequency (e.g. 450 kHz). The thus modulated radio response signals are mixed with the interrogation signal in the transmit and receive module 12 and thereby converted to the subcarrier frequency. Interfering background signals can thus be effectively eliminated by means of appropriate filters.

Said first subcarrier modulation is performed to an equal extent in all three transponders 14, 16, 18. It simply permits a separation between signals that are transmitted by transponders and signals that are reflected e.g. from metal surfaces. Typically, the continuous wave radar system is used for localizing the transmit and receive module. For that purpose the transponders 14, 16, 18 are located at predetermined reference points and are spatially separated from one another. Since it now cannot be distinguished with the aid of the first modulation based on received radio response signals, by which of the three transponders 14, 16, 18 a received radio response signal is transmitted, the radio response signals are subjected to a second modulation which allows a data transmission between a transponder device 14, 16, 18 and the transmit and receive module 12.

Typically, said second modulation is performed in systems having real signal processing by means of amplitude modulation, such as e.g. on/off keying modulation (OOK), since phase modulations can only be demodulated efficiently by means of complex signal processing methods. This enables the radio response signal to be switched on or off by means of a binary sequence. In this way an information-carrying time code can be transmitted on the basis of the radio response signal from one of the transponder devices 14, 16, 18 to the transmit and receive module 12. The coded information preferably contains an identification code which is permanently predefined for each transponder device 14, 16, 18. The transmit and receive module possesses appropriate demodulation means and is therefore able to assign a received radio response signal unequivocally to one of the three transponder devices 14, 16, 18 shown.

If e.g. a plurality of radio response signals are received from different transponders 14, 16, 18 and evaluated, then if the positions of the individual transponders 14, 16, 18 are known, the acquired distance data can be effectively used for precisely localizing or determining the position of the transmit and receive module.

A further advantage of the continuous wave radar system according to the illustrated exemplary embodiment is that even if a radio transmission between the transmit and receive module 12 and e.g. the transponder 18 is interrupted or partially shadowed, radio response signals can still be received as before from the remaining transponders 14 and 16 and evaluated. The continuous wave radar system only requires radio response signals to be received from at least one transponder in order to be able to calculate at least one distance between the transmit and receive module 12 and one of the transponders 14, 16, 18.

Figure 2:
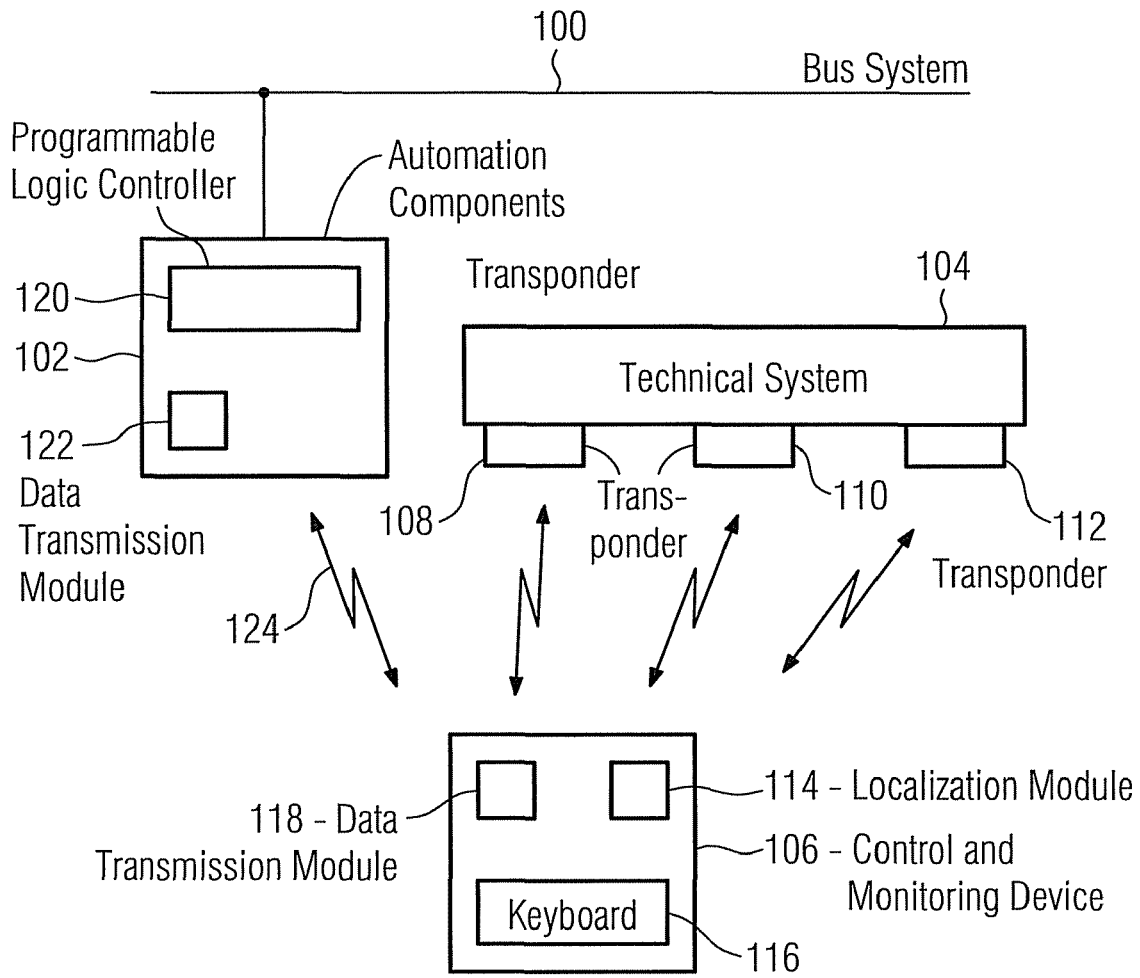
FIG. 2 shows a block diagram of an HMI system.

FIG. 2 shows a block diagram of an HMI system, comprising a technical system 104 having technical operating resources and a control and monitoring device 106 having a transmit and receive module according to the invention. The technical operating resources are e.g. part of a manufacturing or process engineering device. For the purpose of controlling the latter, automation components 102 are present which engage with the technical operating resources, in particular by switching transducers, positioners and various other "process instruments", as they are called. The automation components 102 have, for example, an automation device such as e.g. a programmable logic controller 120 which effects the control of the technical operating resources, in real-time where necessary.

The automation components 102 are preferably associated with a bus system 100, such as e.g. a Profibus. This permits universal networking of a plurality of automation components 102.

In order to control and monitor the automation components 102 and e.g. their executing control, diagnostic, alarm processing and long-term monitoring processes, at least one mobile control and monitoring device 106 is present. This can be embodied e.g. as a cordless handheld terminal and have e.g. a display and a keyboard 116. Emergency stop, on/off and acknowledgement keys and key switches can also be provided. The mobile control and monitoring device 106 exchanges useful data with the automation components 102 of the technical system 104 in a contactless manner via a radio link 124. An operator using the control and monitoring device 106 can thus have e.g. measured values from the technical system 104 displayed on the display of the control and monitoring device 106 or input control commands via its keyboard 116 and send these to the automation components 102.

In order to transmit e.g. measured values and control commands between the mobile control device 106 and the automation components 102, the mobile control device 106 and the automation components 102 have appropriate data transmission modules 118, 122. This data transmission is preferably implemented with the aid of radio frequency (RF) signals. In this case a multiplicity of different data transmission protocols, such as e.g. WLAN, IEEE 802.11, Ultra Wide Band (UWB) or Bluetooth protocols, can be used.

The mobile control device 106 additionally possesses a localization module 114 which is embodied for sending and receiving radar signals. The technical system 104 also has at least one transponder. Preferably the system has a series of transponders 108, 110, 112 which are attached at different reference points on the technical system 104. The transponders are embodied for modulating and reflecting the radar signals transmitted by the localization module 114. The radar signals modulated and reflected by the transponders 108, 110, 112 can then be received by the localization module 114 and evaluated for the purpose of localizing the mobile control device 106. The mobile control device 106 can thus independently determine the position or distance of the transponders 108, 110, 112. In this process the transponders 108, 110, 112 are not required to perform any signal evaluation.

In an inventive development of the HMI system, the localization module 114 is equipped with an above-described transmit and receive module. The radar signals reflected by the transponders 108, 110, 112 can be selectively evaluated by means of a subcarrier modulation performed by the transponders. The subcarrier modulation thus enables background signals to be separated from signals which have been reflected from the transponders. By means of a corresponding subcarrier filtering in the localization module 114 it is therefore possible with the aid of the only briefly transmitted FMCW radar to implement an unequivocal distance measurement for quasi-stationary targets even with a receiver which is designed simply for real signal evaluation in the localization module 114.

Quasi-stationary, in this context, means that the position of the transponders or the position of the radar system does not change during the measurement time, which typically lies in the range of several ms to several 10 ms.

Figure 3:
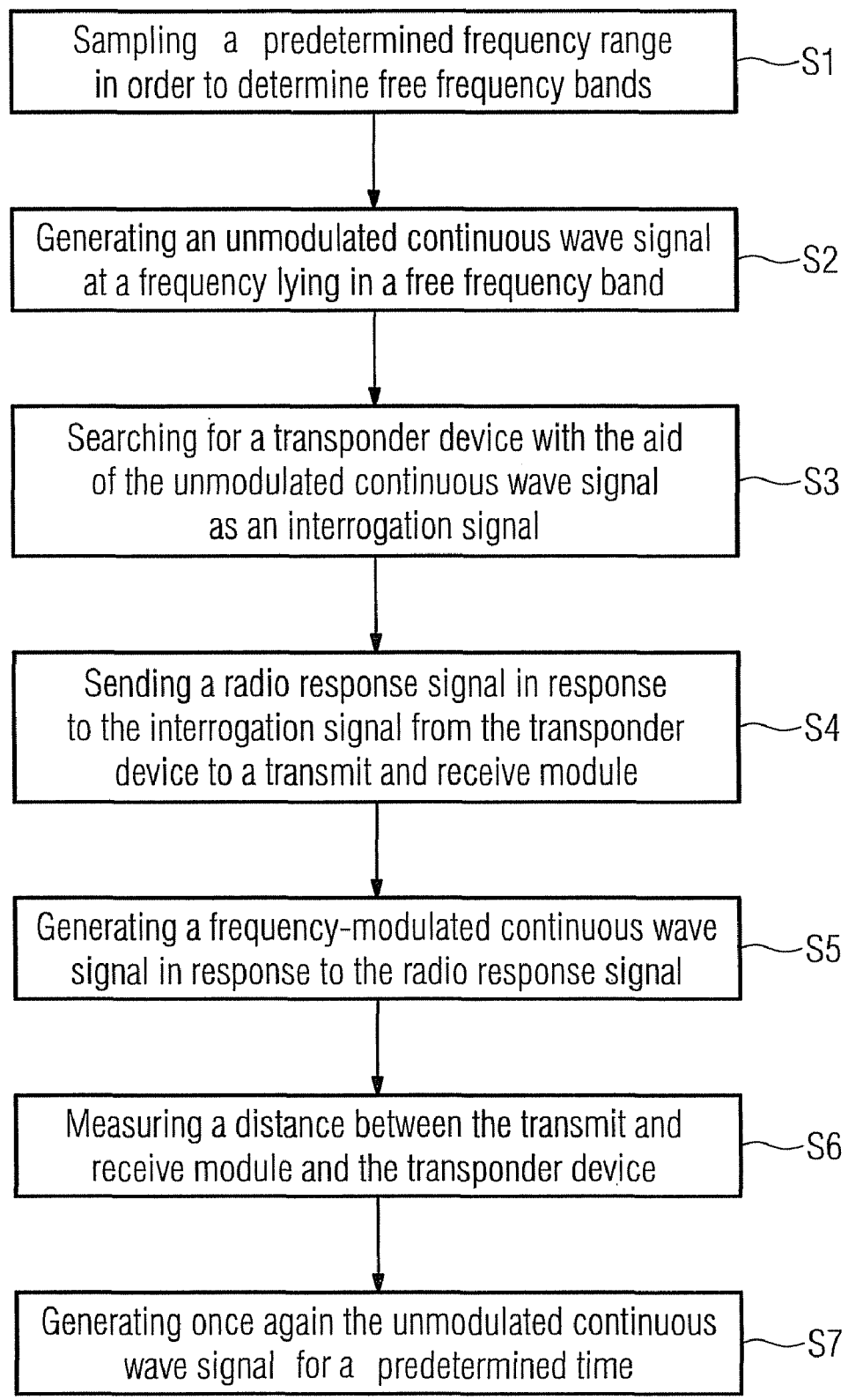
FIG. 3 shows a flowchart of a method according to the invention.

FIG. 3 shows a flowchart of a preferred exemplary embodiment of an inventive method for distance measurement and data transmission in a continuous wave radar system in which a transmit and receive module and at least one transponder device are disposed. In a first step S1, a predetermined frequency range is sampled in order to investigate said frequency range in respect of which frequency bands are still free and are not reserved by other devices or systems. In a second step S2, an unmodulated continuous wave signal is then generated at a frequency which lies in a free frequency band. In a third step S3, a search is conducted for a transponder device with the aid of the unmodulated continuous wave signal as an interrogation signal. In this case transponder devices of the continuous wave radar system are set up in such a way that they send a radio response signal to the transmit and receive module in response to the interrogation signal (step S4).

As soon as the transmit and receive module receives a radio response signal, the generating of the unmodulated continuous wave signal is stopped and a frequency-modulated continuous wave signal is generated in its stead (step S5). In a step S6, a distance between the transmit and receive module and the transponder device which sends the radio response signal is measured with the aid of the frequency-modulated continuous wave signal. After a distance measurement has been completed, in a step S7 the unmodulated continuous wave signal is preferably generated again for a predetermined time; this step can also be performed immediately after step S4 (not shown). In other words, the unmodulated continuous wave signal is generated again for a predetermined time after the transmit and receive module has received a radio response signal from a transponder device. This is advantageous when the radio response signal is sent by a transponder which plays no role or, as the case may be, no critical role in the current application. Thus, an unnecessary measurement of the distance to said transponder can be avoided and instead a new search for a relevant transponder can be started directly.

The invention claimed is:

1. A method for distance measurement and data transmission in a continuous wave radar system in which a transmit and receive module and a transponder device are disposed, comprising:
generating an unmodulated continuous wave signal at a selected frequency band in the transmit and receive module, the unmodulated continuous wave signal to be broadcast over-the-air in a predefined frequency spectrum allocated to wireless radio frequency communication to interrogate a transponder, wherein before the unmodulated continuous wave signal is broadcast over-the-air to interrogate the transponder device, performing an over-the-air monitoring of the frequency spectrum allocated to wireless radio frequency communication to determine at least one frequency band available in the predefined frequency spectrum to broadcast the unmodulated continuous wave signal without mutual interference with a further transmit and receive module, and wherein the selected frequency band of the unmodulated continuous wave signal corresponds to said at least one available frequency band;
searching for the transponder device with the aid of the unmodulated continuous wave signal as an interrogation signal;
sending a radio response signal in response to the interrogation signal from a transponder device to the transmit and receive module;
generating a frequency-modulated continuous wave signal in the transmit and receive module in response to the radio response signal; and
measuring a distance between the transmit and receive module and the transponder device with the aid of the frequency-modulated continuous wave signal.

2. The method as claimed in claim 1, wherein a radiation frequency of the unmodulated continuous wave signal is keyed in the transmit and receive module at a predetermined frequency during the searching for a transponder device.

3. The method as claimed in claim 2, wherein the transmit and receive module generates a real signal from the received radio response signal.

4. The method as claimed in claim 1, wherein the transmit and receive module generates a real signal from the received radio response signal.

5. The method as claimed in claim 4, wherein the transmit and receive module performs a decoding of the data transmitted by the radio response signal and performs a distance measurement based on the real signal.

6. The method as claimed in claim 1, wherein the transmit and receive module performs a decoding of the data transmitted by the radio response signal and performs a distance measurement based on the received radio response signal.

7. The method as claimed in claim 1, wherein the unmodulated continuous wave signal is generated once again for a predetermined time following completion of data decoding and/or distance measurement.

8. The method as claimed in claim 1, wherein the phase of the unmodulated continuous wave signal is shifted at a predetermined frequency, the shift amounting to +/−90°.

9. The method as claimed in claim 8, wherein the phase shift is performed in the transmit and receive module or in the transponder device.

10. A continuous wave radar system, comprising:
a transmit and receive module configured to generate an unmodulated continuous wave signal at a selected frequency band and a frequency-modulated continuous wave signal, the unmodulated continuous wave signal to be broadcast over-the-air in a predefined frequency spectrum allocated to wireless radio frequency communication to interrogate a transponder;
a monitor configured to monitor over-the-air and before the unmodulated continuous wave signal is broadcast over-the-air, the predefined frequency spectrum allocated to wireless radio frequency communication to determine at least one frequency band available in the predefined frequency spectrum to broadcast the unmodulated continuous wave signal without mutual interference with a further transmit and receive module, wherein the selected frequency band of the unmodulated continuous wave signal corresponds to said at least one available frequency band; and
the transponder device configured to send a radio response signal in response to an interrogation signal, wherein the transmit and receive module is also configured to generate the unmodulated continuous wave signal as an interrogation signal for searching for the transponder device and to generate the frequency-modulated continuous wave signal in response to a radio response signal from the transponder device.

11. The continuous wave radar system as claimed in claim 10, wherein the transmit and receive module includes frequency shift keying means for keying the frequency of the unmodulated continuous wave signal during the search for the transponder device.

12. The continuous wave radar system as claimed in claim 10, further comprising:
- a mixer for generating a real signal from the received radio response signal.

13. The continuous wave radar system as claimed in claim 12, further comprising:
- a demodulation unit for decoding the data transmitted by the radio response signal; and
- an evaluation unit for distance measurement, wherein the decoding and the distance measurement are performed based on the real signal.

14. The continuous wave radar system as claimed in claim 10, wherein the transmit and receive module includes a complex receiver.

15. The continuous wave radar system as claimed in claim 10, wherein the transmit and receive module is configured to generate the unmodulated continuous wave signal once again for a predetermined time following completion of data decoding and/or distance measurement.

16. The continuous wave radar system as claimed in claim 10, further comprising:
- phase shifting means for shifting the phase of the unmodulated continuous wave signal at a predetermined frequency, the shift amounting to +/−90°.

17. The continuous wave radar system as claimed in claim 16, wherein the phase shifting means are disposed in the transmit and receive module or in the transponder device.

18. A mobile control and monitoring device for automation components of a technical system, comprising:
- a transmit and receive module configured to generate an unmodulated continuous wave signal at a selected frequency band and a frequency-modulated continuous wave signal, wherein the transmit and receive module is also configured to generate the unmodulated continuous wave signal for searching for a transponder device and to generate the frequency-modulated continuous wave signal in response to a radio response signal from the transponder device,
- wherein the unmodulated continuous wave signal is to be broadcast over-the-air in a predefined frequency spectrum allocated to wireless radio frequency communication to search for the transponder; and
- a monitor configured to monitor over-the-air and before the unmodulated continuous wave signal is broadcast over-the-air, the predefined frequency spectrum allocated to wireless radio frequency communication to determine at least one frequency band available in the predefined frequency spectrum to broadcast the unmodulated continuous wave signal without mutual interference with a further transmit and receive module, wherein the selected frequency band of the unmodulated continuous wave signal corresponds to said at least one available frequency band.

* * * * *